United States Patent Office 3,098,974
Patented July 23, 1963

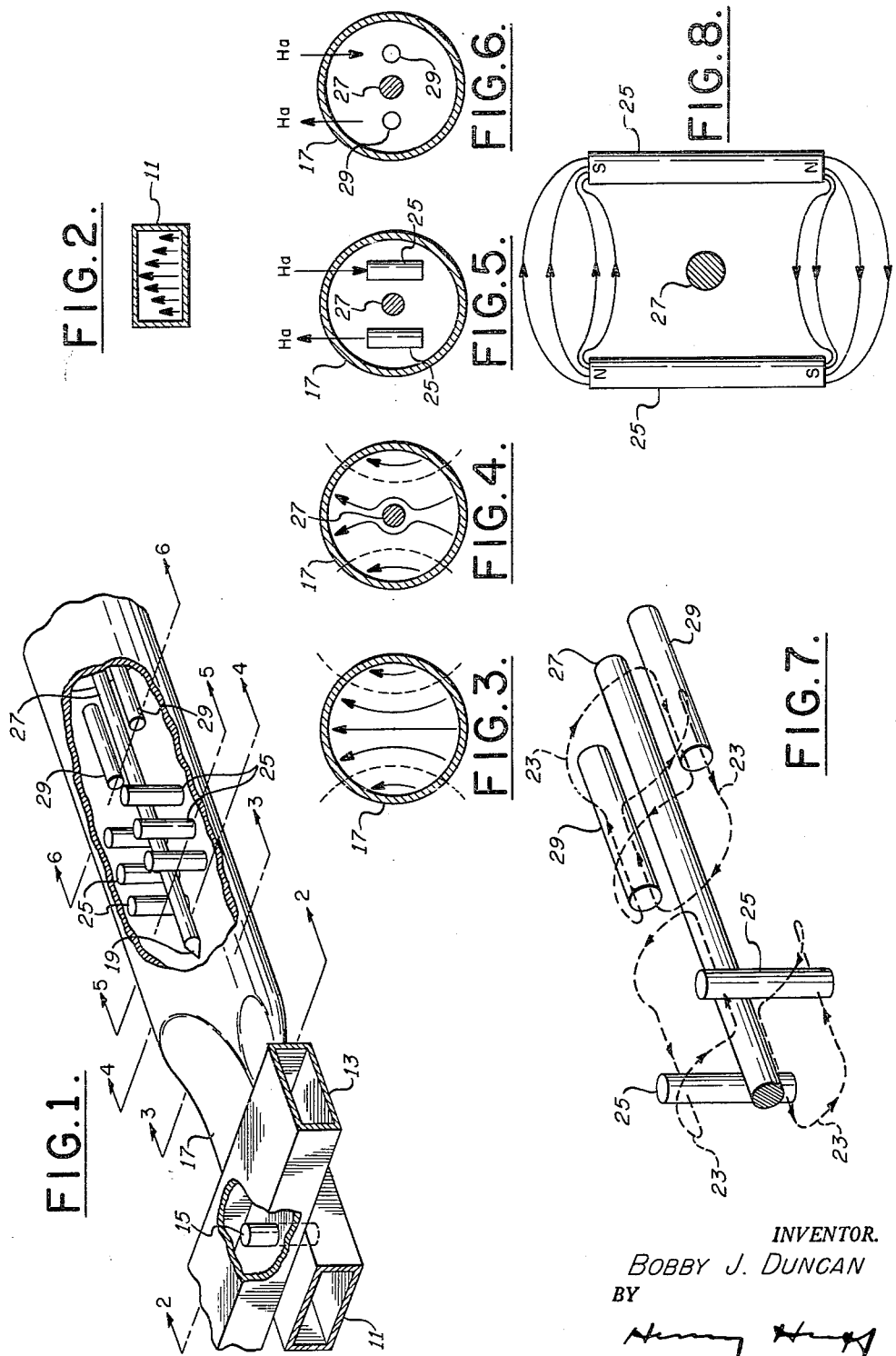

3,098,974
MIXER EMPLOYING GYROMAGNETIC ELEMENTS
Bobby J. Duncan, Clearwater, Fla., assignor to Sperry Rand Corporation, Great Neck, N.Y., a corporation of Delaware
Filed Oct. 30, 1961, Ser. No. 148,369
6 Claims. (Cl. 325—448)

This invention relates to frequency changing devices, and more specifically to microwave devices for obtaining a signal equal in frequency to the frequency difference between two input signals.

Conventional mixing devices using crystals are limited to low power levels and are frequently noisy. Furthermore, such devices have a threshold of sensitivity that prohibits their use at very low signal levels.

Solid state microwave frequency mixers have been proposed, but they are narrow band devices requiring the use of resonant cavities. Still others are not capable of transmitting low intermediate frequency output signals.

Therefore, it is an object of the present invention to provide a microwave difference frequency mixer capable of operating at high power levels.

It is another object of the present invention to provide a microwave difference frequency mixer capable of operating efficiently over a relatively broad band of frequencies.

Yet another object of the present invention is to provide a microwave difference frequency mixer capable of transmitting a relatively low frequency output signal.

The present invention utilizes magnetically polarized elements of material exhibiting the gyromagnetic effect at wave frequencies within the operating range of frequencies. Hereinafter when the term "gyromagnetic material" is used, the more completely descriptive definition given will be implied.

If a constant magnetic field is applied along one axis of a gyromagnetic material, the corresponding magnetization can be represented by a vector collinear with the axis of the applied field.

When one or more alternating magnetic fields are then applied in a direction perpendicular to that of the constant magnetic field, the magnetization vector is caused to precess around the axis of the steady magnetic field. This motion of the magnetization vector causes it to describe a cone with an elliptical cross section. As the frequency of oscillation of the magnetization vector approaches the gyromagnetic resonance frequency of the material, the cross section of the cone becomes substantially circular. When two or more alternating magnetic fields having different frequencies are applied, the angle that the magnetization vector makes with the axis of the steady magnetic field varies at a rate equal to the frequency difference between the applied alternating magnetic fields. Under these conditions, the projection of the magnetization vector on the axis of the steady magnetic field varies at a frequency equal to the difference frequency of the applied alternating magnetic fields. This is equivalent to a component of magnetic force oscillating at the difference frequency in the direction of the steady magnetic field. A more complete description of this phenomenon is given in the paper by J. E. Pippin, published in the August 1956 issue of the Proceedings of the Institute of Radio Engineers, volume 44, pages 1054–1055.

The present invention employs an arrangement of gyromagnetic elements operating according to the foregoing theory in such a way that the contributions of the individual gyromagnetic elements are combined to form a concentric magnetic field oscillating at the difference frequency. This launches a TEM mode wave in the output means that is relatively constant with changes in frequency or power level.

The nature of the invention, its application, and further objects will be better appreciated from the following detailed description taken in connection with the accompanying drawings in which:

FIG. 1 is a perspective view, partly in cross section, of a presently preferred form of the invention, FIGS. 2–6 inclusive are sectional views taken at right angles to the axis of the frequency mixer along the lines 2—2 to 6—6 of FIG. 1, FIG. 7 is a diagram illustrating the spatial relationship of the various gyromagnetic elements to the magnetic fields of the incident waves in the embodiment of the invention depicted in FIG. 1, and FIG. 8 is a diagram illustrating the distribution of induced magnetic flux about the gyromagnetic mixing elements of the embodiment of the invention depicted in FIG. 1.

Referring now to FIG. 1, a presently preferred embodiment of the invention comprises a first rectangular input wave guide 11 for coupling an incoming signal to the mixer. A second rectangular input wave guide 13 couples another signal such as that from a local oscillator into the wave guide 11 by means of a gyromagnetic coupling means 15. A directional coupler of this type is described in the article: "Magnetically Controlled Microwave Directional Coupler," by R. W. Damon, published in the Journal of Applied Physics, volume 26, October 1955, pages 1281–2. This type of coupler is not essential to the operation of the invention, but provides a convenient and efficient coupling means for combining the two input signals.

The combined energy from the inputs 11 and 13 is propagated toward the coaxial section in the dominant or $TE_{10}$ mode as best seen in FIG. 2 wherein the arrows represent voltage vectors. A transition 17 converts the mode of propagation of this energy into the dominant or $TE_{11}$ mode for circular wave guides as best seen in FIG. 3. A coaxial transition means 19 comprises a conducting member tapered on the input end to provide a $TE_{11}$ higher order coaxial line mode of propagation as depicted in FIG. 4. Experiments have shown that the desired $TE_{11}$ mode is formed by means of this type of transition. Experiments have further shown that no detectable dominant or other higher order modes at the incident frequencies result in the use of this transition.

The $TE_{11}$ coaxial line mode thus formed contains two planes of magnetic circular polarization 21 as indicated in FIG. 4. The magnetic loops 23 associated with this mode of propagation are best seen in simplified form in FIG. 7.

One or more pairs of gyromagnetic mixing elements 25 are disposed along the side of the center conductor 27 of the coaxial transmission line section. Elements 25 can be constructed conveniently from cylinders of narrow line width yttrium-iron garnet, although single crystal yttrium-iron garnets or ferrite materials may be used for this purpose. Materials of this general class are discussed in the paper "Microwave Properties of Polycrystalline Hybrid Garnets," by G. R. Harrison and L. R. Hodges, published on pages 53–59 of the Microwave Journal for June 1961.

The gyromagnetic mixing elements 25 are arranged symmetrically on either side of the center conductor 27 and in the planes of circular polarization of the incident wave.

A steady magnetic biasing field is applied transversely to gyromagnetic elements 25 so that the two members of the pair are biased in a sense opposite to each other as indicated by the $H_a$ vectors in FIG. 5.

Magnetic field loops 23 sweep across the gyromagnetic mixing elements 25 as the $TE_{11}$ wave propagates through the device, as best seen in FIG. 7. As the loops pass the elements 25, the flux from these loops passing through the individual elements 25 changes in direction. Thus the magnetic field in a specific element continually rotates in a given direction as the wave progresses.

It will be appreciated that FIG. 7 represents a greatly simplified diagram of the magnetic fields of the incident wave. Since the incident wave is composed of two different frequencies, loops of different lengths would have to be included to make the diagram complete. Furthermore, the number of individual loops has been reduced to a minimum for purposes of clarity.

As was explained previously, gyromagnetic materials magnetized by a steady magnetic field in one direction, and subjected to additional magnetic fields rotating in a plane perpendicular to the axis of the steady field can generate a new magnetic field oscillating at the difference frequency between two of the rotating magnetic fields. Furthermore, this difference magnetic field is oriented along the direction of the steady magnetic field. In the design of FIG. 7, the field generated in the first element of a given pair of elements will be oriented in a sense opposite to that of the corresponding field generated in the second element of the given pair. Both however will be in the vertical plane. Because any microwave magnetic field must terminate on itself, the combined magnetic components in the individual elements 25 create a closed loop around the center conductor 27 as depicted in FIG. 8. This condition is exactly that present for a TEM wave. Propagation of this mode can only be out of the coaxial line since the input section of circular wave guide will be far beyond cut-off for this difference frequency.

In its presently preferred form, a local oscillator signal is fed into the wave guide 13. The frequency of this signal is preferably chosen to be equal to the solid state material resonance frequency of the gyromagnetic mixing element 25 and separated sufficiently from the signal so that the difference frequency is at least twice the solid state material line width of the elements 25. By choosing a local oscillator frequency equal to the solid state material resonance frequency, this local oscillator signal is largely absorbed by the solid state material. By selecting the local oscillator signal so that the difference frequency is twice the solid state material line width, attenuation of the difference signal will be made negligible.

Gyromagnetic suppressor elements 29 are disposed on either side of the center conductor 27 and in the plane of circular polarization of the incident wave. These elements are broad line width materials that can absorb any non-converted input and local oscillator frequencies, as opposed to the narrow line width gyromagnetic materials used for the mixing elements 25.

The suppressor elements 29 are oppositely biased as shown in FIG. 6. The same biasing means used to bias the mixing elements 25 may be used to bias the suppressor elements 29 if the magnetic intensity required for the two groups of elements is approximately the same.

The portions of the original input or local oscillator signals that are not absorbed in the mixing elements 25 will continue to propagate in the $TE_{11}$ coaxial line mode. The magnetic loops associated with this mode set up rotating magnetic fields in the suppressor elements. Since the elements are biased to resonance, these waves are absorbed by the suppressor element according to the theory explained in detail in a paper by C. L. Hogan, published in the January 1952 issue of the Bell Systems Technical Journal, volume 31, pages 1–31. The broad band width of these elements assures that all frequencies of interest propagating in the $TE_{11}$ mode will be absorbed.

A difference frequency generated by the mixing elements 25, however, propagates in the TEM mode. This mode has an annular magnetic field that is concentric with the center conductor 27. This field has no region of circular polarization and is far removed from the frequency of gyromagnetic resonance of the suppressor elements 29. Thus, the field encounters little loss and passes freely by these suppressor elements.

Other varieties of mode suppressors may be used without departing from the spirit of the invention; however, the described structure is presently preferred.

Several pairs of gyromagnetic mixing elements may be used as depicted in FIG. 1 in order to enhance the production of TEM waves and to more efficiently absorb the local oscillator frequency.

Slabs of gyromagnetic material may be used instead of the cylindrical shapes shown in the presently preferred embodiment of the invention, although the cylindrical shapes presently appear to perform most efficiently.

Broadbanding of the mixer may be accomplished by stagger tuning the pairs of gyromagnetic mixing elements using materials with different values of saturation magnetization.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for mixing two signals of different frequencies comprising a section of coaxial transmission line, means for supplying first and second signals to said coaxial transmission line in the $TE_{11}$ mode of propagation, a pair of gyromagnetic mixing elements disposed symmetrically on opposite sides of the center conductor of said coaxial transmission line and in the planes of circular polarization of the incident energy, means for magnetically biasing each gyromagnetic element of said pair in a sense opposite to each other and in a direction perpendicular to the axis of said transmission line, and gyromagnetic elements when thus magnetized and excited cooperating to yield a microwave signal having a frequency equal to the difference of the frequencies of said first and second input signals and propagating in the TEM mode, a mode suppressor for passing only the energy propagating in the TEM mode, and output means for coupling the TEM mode energy to utilization means.

2. Apparatus for mixing two signals of different frequencies comprising a section of coaxial transmission line, means for supplying first and second signals to said coaxial transmission line in the $TE_{11}$ mode of propagation, a pair of cylindrical gyromagnetic mixing elements in said coaxial transmission line disposed symmetrically in a transverse plane on opposite sides of the center conductor and in the regions of circular polarization of the incident energy, said gyromagnetic mixing elements further characterized by the fact that they have a solid state material resonance frequency substantially equal to the frequency of one of the input signals, means for magnetically biasing each gyromagnetic element of said pair in a sense opposite to each other and in a direction perpendicular to the axis of said transmission line, said gyromagnetic elements when thus magnetized and excited cooperating to yield a microwave signal having a frequency equal to the difference of the frequencies of said first and second input signals and propagating in the TEM mode, a mode suppressor for passing only the energy propagating in the TEM mode, and output means for coupling the TEM mode energy to utilization means.

3. A microwave frequency mixer comprising input means for combining the signals to be mixed, circular wave guide transition means for converting the propagation mode of the combined input signals into the dominant circular wave guide mode, coaxial transition means for converting the propagation mode from the dominant circular wave guide mode to a higher order coaxial line mode, a coaxial transmission line coupled to receive the energy propagating in said higher order mode, a pair of gyromagnetic mixing elements disposed symmetrically on opposite sides of the center conductor of said coaxial transmission line so as to be in regions of circular polarization of the incident wave, said pair of gyromagnetic mixing elements being further characterized in that the individual elements of said pair are magnetized in a sense opposite to each other and in a direction perpendicular to the axis of the coaxial transmission line so that the incident wave interacts with the gyromagnetic elements to cause a coaxial magnetic field to be generated at a frequency equal to the difference in frequencies of the input signals, gyromagnetic suppressor means for absorbing energy propagating in the higher order coaxial mode but passing energy flowing in the principal coaxial line mode, and coaxial output means for coupling the difference frequency energy to exterior utilization means.

4. A microwave difference frequency mixer comprising input means for combining the signals to be mixed, a circular wave guide capable of transmitting the combined input signals in the $TE_{11}$ mode of propagation, a coaxial transmission line coupled to receive the output of said circular wave guide, a pair of gyromagnetic mixing elements disposed symmetrically on opposite sides of the center conductor of said coaxial transmission line so as to be in a plane of circular polarization of the incident $TE_{11}$ wave, means for magnetically biasing each gyromagnetic element of said pair in a sense opposite to each other and in a direction perpendicular to the axis of said transmission line, whereby the incident $TE_{11}$ mode wave interacts with the gyromagnetic mixing elements to cause a coaxial magnetic field to be generated at a frequency equal to the difference in input signal frequencies, gyromagnetic suppressing means for absorbing the energy being propagated in the $TE_{11}$ mode and passing energy propagating in the TEM mode, and coaxial output means for coupling the TEM mode energy to exterior utilization means.

5. A microwave frequency mixer comprising a first transmission line for receiving a first input signal, a second transmission line for receiving a second input signal, coupling means for introducing the second signal into the first transmission line, a circular wave guide transmission line section capable of supporting the $TE_{11}$ circular wave guide mode of propagation coupled to the output of said first transmission line, a coaxial transmission line coupled to receive the output of said circular wave guide, a pair of gyromagnetic mixing elements disposed symmetrically on opposite sides of the center conductor in the planes of circular polarization of the incident energy, magnetic biasing means for producing a transverse magnetic field of one polarity in the first of said pair of gyromagnetic elements and for producing the transverse magnetic field of the opposite polarity in the second of said pair of gyromagnetic elements, said gyromagnetic elements when thus magnetized and excited cooperating to yield a microwave signal having a frequency equal to the difference of the frequencies of said first and second input signals and propagating in the TEM mode, gyromagnetic suppressor means in said coaxial transmission line for absorbing energy propagating in the $TE_{11}$ mode but passing energy propagating in the TEM mode, and coaxial output means for coupling the TEM mode energy to exterior utilization means.

6. A microwave difference frequency mixer comprising a first rectangular wave guide transmission line for coupling a $TE_{10}$ mode received signal to the mixer, a second rectangular wave guide transmission line for coupling a $TE_{10}$ mode local oscillator signal to the mixer, gyromagnetic coupling means for introducing the local oscillator signal into said first transmission line, a rectangular wave guide-to-circular wave guide transition for converting the $TE_{10}$ mode energy from said first transmission line to $TE_{11}$ circular wave guide mode energy, a coaxial transmission line coupled to receive the energy from said transition, a pair of elongated gyromagnetic mixing elements in said coaxial transmission line disposed symmetrically in a transverse plane on opposite sides of the center conductor of said coaxial transmission line so that the longitudinal axes of said gyromagnetic elements are parallel to the narrow walls of said first transmission line, magnetic biasing means for applying a unidirectional magnetic field along the length of the first of said pair of gyromagnetic mixing elements, magnetic biasing means for applying a unidirectional magnetic field of opposite polarity along the length of the second of said pair of gyromagnetic mixing elements, a pair of elongated gyromagnetic suppressor elements disposed symmetrically on opposite sides of the center conductor of said coaxial line so that the longitudinal axes of the gyromagnetic suppressor elements and the axis of the center conductor are parallel and lie in the diametral plane parallel to the broad walls of said first transmission line, magnetic biasing means for applying a unidirectional magnetic field across the narrow dimension of the first of said pair of suppressing elements, magnetic biasing means for applying a unidirectional magnetic field of opposite polarity across a second of said pair of suppressor elements, and coaxial output means for coupling the mixer to exterior utilization means.

No references cited.